US012051555B2

(12) United States Patent
Wilhelm

(10) Patent No.: US 12,051,555 B2
(45) Date of Patent: Jul. 30, 2024

(54) USE OF A HV HRC FUSE FOR A DROP-OUT FUSE SYSTEM

(71) Applicant: SIBA Fuses GmbH, Lünen (DE)

(72) Inventor: Dirk Wilhelm, Lünen (DE)

(73) Assignee: S1BA Fuses GmbH, Lünen (DE)

( * ) Notice: Subject to any disclaimer, the term of this patent is extended or adjusted under 35 U.S.C. 154(b) by 0 days.

(21) Appl. No.: 17/933,668

(22) Filed: Sep. 20, 2022

(65) Prior Publication Data

US 2024/0013997 A1 Jan. 11, 2024

(30) Foreign Application Priority Data

Jul. 5, 2022 (DE) ........................ 102022002431.4

(51) Int. Cl.

*H01H 31/12* (2006.01)
*H01H 85/055* (2006.01)
*H01H 85/143* (2006.01)
*H01H 85/165* (2006.01)

(52) U.S. Cl.

CPC ........ *H01H 85/055* (2013.01); *H01H 31/127* (2013.01); *H01H 85/143* (2013.01); *H01H 85/165* (2013.01)

(58) Field of Classification Search

CPC .. H01H 31/127; H01H 85/055; H01H 85/143; H01H 85/165; H01H 85/185
See application file for complete search history.

(56) References Cited

U.S. PATENT DOCUMENTS 2,324,114 A * 7/1943 Schultz ................ H01H 31/127 337/171
3,842,384 A * 10/1974 Miller .................. H01H 31/127 337/171
4,153,893 A * 5/1979 Swanson ............. H01H 85/303 337/248

(Continued)

FOREIGN PATENT DOCUMENTS

| | | | |
|---|---|---|---|
| DE | 3409957 | A1 | 9/1985 |
| DE | 102018009183 | A1 | 5/2020 |
| EP | 0660351 | A2 | 6/1995 |

OTHER PUBLICATIONS

Office Action in corresponding German Application 10 2022 002 431.4, dated Jan. 12, 2023, 10 pages, and English Machine Translation.

*Primary Examiner* — Jacob R Crum
(74) *Attorney, Agent, or Firm* — Andrus Intellectual Property Law, LLP

(57) ABSTRACT

A HV HRC fuse, in particular a HH full-range fuse, for a drop-out fuse system with a drop-out release mechanism has an outer fuse housing, wherein at least one melting conductor, which is wound around at least one winding body, is provided in the fuse housing. The fuse housing is at least partially open on two end faces and a contact cap designed for electrical contacting is arranged on each end face of the fuse housing. The upper contact cap is detachably connectable in a contacting position with the drop-out release mechanism and the lower contact cap is pivotally mounted on the drop-out release mechanism. Tripping of the HV HRC fuse results in tripping of the drop-out release mechanism, whereby the upper contact cap is separated from the drop-out release mechanism and the HV HRC fuse swings out from the contacting position to a swing-out position.

18 Claims, 9 Drawing Sheets

(56) References Cited

U.S. PATENT DOCUMENTS

| | | | | | |
|---|---|---|---|---|---|
| 5,274,349 | A * | 12/1993 | Hassler | H01H 9/32 | 337/171 |
| 5,463,366 | A * | 10/1995 | Hassler | H01H 85/12 | 337/159 |
| 5,760,673 | A * | 6/1998 | Hassler | H01H 85/38 | 337/171 |
| 5,892,427 | A * | 4/1999 | Handcock | H01H 85/12 | 337/229 |
| 6,831,546 | B2 * | 12/2004 | Kaltenborn | H01H 85/306 | 116/281 |
| 2005/0104709 | A1 * | 5/2005 | Montante | H01H 31/127 | 337/171 |

* cited by examiner

USE OF A HV HRC FUSE FOR A DROP-OUT FUSE SYSTEM

CROSS-REFERENCE TO RELATED APPLICATION

The present application claims priority to German Patent Application No. 10 2022 002 431.4, filed Jul. 5, 2022, which is incorporated herein by reference in its entirety.

BACKGROUND

The present disclosure relates to the use of a fuse for a drop-out fuse system having a drop-out release mechanism.

Such fuse systems are known in the state of the art for the high-voltage case.

Particularly in electrical power distribution, preferably in the high-voltage range, a fuse and/or cut-off protection system is a combination of a fuse and a switch. The combination of the fuse and the switch can be used in overhead power lines and corresponding taps of the overhead power lines to ultimately protect the entire system from power surges and overloads. An overcurrent caused by a fault in the transformer or circuit leads to tripping, in particular by melting of the fuse, and ultimately to disconnection of the corresponding line protected by the fuse from the grid.

In the prior art, a drop-out fuse system known from practice provides for the fuse to be arranged on the lines to be fused via the drop-out release mechanism. When the fuse is tripped, an explosion caused by black powder is then used to swing the fuse over and/or out in order to make the tripping of the fuse visible by "hanging down" of the fuse.

To remove the fuse, a corresponding grip or pull ring can be provided on the drop-out release mechanism, which can also be arranged on the fuse. This ring can ultimately be arranged in particular at the end of the fuse that is free in the tripped state. In the event of tripping, a power supply company can then remove the fuse by gripping the fuse on the pull ring and thus also replace it.

It is also known from practice to mount the fuses at an angle to the lines so that the center of gravity of the fuse as well as the fuse holder (of the drop-out release mechanism) is shifted and the fuse holder rotates in case of tripping and falls down under its own weight when the fuse blows.

A disadvantage of the system known from the prior art is that when the fuse is triggered, a flying spark is generated by the explosion that occurs in the event of triggering. For this reason, the fuse used in such systems is also known as a rocket fuse. However, this flying spark can lead to the development of a large-scale fire, especially in very dry areas or in forest areas or the like, which can result in natural disasters with high consequential costs.

SUMMARY

It is therefore an object of the present disclosure to avoid, or at least substantially reduce, flying sparks when the drop-out fuse is triggered.

The aforementioned object is solved by the use of a HV HRC fuse, in particular a HV HRC full-range fuse, for a drop-out fuse system with a drop-out release mechanism. The designation "HV HRC fuse" denotes a high-voltage, high-capacity fuse which can ultimately serve to protect the electrical current not only preferentially in a partial area, but in a whole area.

According to the invention, the HV HRC fuse has an outer fuse housing. In the fuse housing, at least one melting conductor is provided which is wound around at least one, in particular electrically insulating, winding body, preferably in the form of a spiral. The fuse housing is at least partially open on two end faces, with at least one contact cap, preferably designed for electrical contact, being arranged on each end face of the fuse housing.

The upper contact cap is detachably connectable to the drop-out release mechanism in a contacting position, wherein the lower contact cap is pivotally mounted on the drop-out release mechanism. The contacting position of the HV HRC fuse is provided in so-called "normal operation". In the contacting position and/or in normal operation, both contact caps are ultimately connected to the drop-out release mechanism.

In turn, the drop-out release mechanism is configured such that tripping of the HV HRC fuse results in tripping of the drop-out release mechanism, causing the upper contact cap to separate from the drop-out release mechanism and the HV HRC fuse to pivot out from the contacting position to a pivoted-out position. In particular, the HV HRC fuse pivots about its center of gravity. The HV HRC fuse is thus also connected to the drop-out release mechanism in the outward pivoted position via a contact cap (namely the lower contact cap) and is pivotably mounted in this area.

According to the invention, the advantages achieved are in particular that, on the one hand, the high voltages and currents in the distribution of high voltage can be safeguarded by using a HV HRC fuse, while on the other hand, spark-free switching of the HV HRC fuse is ensured at the same time.

Ultimately, it is possible to ensure that the HV HRC fuse swings out in particular without sparking. For this purpose, it can be provided that the HV HRC fuse in the event of tripping has such a mechanism and/or is designed in such a way that a spark-free swinging out of the HV HRC fuse can be ensured through interaction with the drop-out release mechanism. Preferably, a spark-free switching/triggering of the HV HRC fuse can thus trigger the drop-out release mechanism.

Furthermore, according to the invention, a rotation- and tension-resistant structure of the HV HRC fuse is used for the first time in a drop-out fuse system.

It is noteworthy that it has not been known in the prior art to use the HV HRC fuse, which meets high safety requirements, also for a drop-out fuse system. This could only be established by the invention. It is understood that the HV HRC fuse used in the invention preferably has energy-specific designs in order to realize very special advantages of the drop-out fuse system.

A drop-out fuse system uses—as described above—a swing-out of the fuse in case of tripping. Such a swing-out can be achieved by the use of the HV HRC fuse according to the invention, in particular without an explosion caused by black powder.

In addition, the mechanical pivoting movement is preferably enabled—preferably without interference—when the HV HRC fuse is triggered in the fuse case, in particular for both the drop-out release mechanism and the HV HRC fuse as such.

Thus, according to the invention, the danger of a fire can also be avoided when the fuse is triggered. In addition, the fuse system according to the invention can also be used, in particular, in forest areas or the like, where there are high requirements with regard to the protection of the surroundings. In particular, switching and fusing of the electric current can be performed safely according to the invention.

It is particularly preferred that the drop-out fuse system is designed in accordance with ANSI IEEE C37.41 (as of June 2022). This standard specifies in particular which characteristic values and standard specifications a drop-out fuse system must comply with. Preferably, the drop-out fuse system according to the invention is based on and/or complies with the currently applicable regulations. Furthermore, these regulations describe the actual breaking and/or tripping behavior of the fuse and of the fuse holder (drop-out release mechanism).

In particular, the range of the current intensity of the current to be transmitted is specified as a function of the rated breaking capacity and the smallest inrush current of the HV HRC fuse.

The rated voltage and/or rated voltage range of the HV HRC fuse is in particular the voltage and/or voltage range at which the fuse is used and/or for which the fuse is tested. Basically, a distinction must be made between an upper rated voltage and a lower rated voltage, the lower rated voltage indicating the voltage at which the HV HRC fuse still switches, the upper rated voltage representing the upper limit for the voltage to be transmitted. Consequently, the rated voltage and/or rated voltage range indicates the permissible voltage range of the HV HRC fuse. In particular, the rated voltage range corresponds to the voltage range that can be protected by the HV HRC fuse.

The maximum breaking current is the maximum current that the fuse can still switch. Consequently, the rated breaking capacity of the HV HRC fuse is greater than the maximum short-circuit current at the point of use of the HV HRC fuse. The rated breaking capacity of the HV HRC fuse is in particular the rated value of a maximum breaking current.

The rated value of the minimum breaking current is to be understood as the smallest breaking current. From this current level, the HV HRC fuse is able to switch the overcurrent. Consequently, the electrical components (load, current source, etc.) on the HV HRC fuse in particular must be arranged and/or designed in such a way that no overcurrent can occur at the point of entry of the fuse that falls below the minimum breaking current. The minimum breaking current may depend on the selected design of the HV HRC fuse. Accordingly, it is possible in particular according to the invention to switch off comparatively low currents at a high DC voltage.

Furthermore, in another preferred embodiment, it is provided that the HV HRC fuse is designed in such a way that a rated current intensity of greater than 30 A, preferably greater than 40 A, more preferably greater than 50 A, is ensured, preferably at a rated voltage of greater than 5 kV, more preferably at a rated voltage of greater than 10 kV and in particular at a rated voltage of greater than or equal to 15 kV. Accordingly, in particular, the rated current range may be greater than 10 A, preferably greater than 15 A, and/or may be between 15 A to 75 kA, preferably between 10 A to 50 kA.

Furthermore, in another preferred embodiment of the invention, it may be provided that the rated breaking capacity (i.e., the rated value of the largest breaking current) is designed to be greater than 1 kA, preferably greater than 10 kA, more preferably greater than 20 kA, and/or is between 1 kA to 100 kA, preferably between 10 kA to 80 kA, more preferably between 20 kA to 50 kA.

In addition, the rated voltage of the HV fuse can be greater than 5 kV, preferably greater than 10 kV, more preferably greater than 15 kV, and/or less than 150 kV, preferably less than 100 kV, more preferably less than 75 kV, more preferably less than 52 kV, and/or between 4 kV to 100 kV, preferably between 4 kV to 80 kV, more preferably between 10 kV to 52 kV.

Preferably, the HV HRC fuse has a spring-loaded stroke pin movably mounted in the fuse housing and held on the fuse housing. Particularly preferably, the release mechanism for the stroke pin is arranged in the interior of the winding body to reduce the size and to achieve optimum insulation of the melting conductor system.

In another preferred embodiment of the idea of the invention, it is provided that the stroke pin exits the fuse housing after release with a fixed exit energy and/or release force and preferably reaches the minimum travel length required to trigger the drop-out release mechanism within a stroke pin travel time. In particular, after release, the stroke pin emerges from the lower contact cap, which is pivotably mounted on the drop-out release mechanism.

Alternatively or additionally, it can preferably be provided that the stroke pin leads to the triggering of the drop-out release mechanism and/or to its actuation. Triggering the release mechanism in turn transfers the fuse from the contact position to the swing-out position. For this purpose, the release mechanism is designed in such a way that the connection to the upper contact cap is interrupted and released, so that the HV HRC fuse swings out with its upper contact cap pointing downwards. This mechanical movement can ultimately be caused by the stroke pin and its emergence. Particularly preferably, the stroke pin emerges for this purpose with a specific emergence force that is ultimately sufficient to actuate the release mechanism. In particular, the stroke pin exerts a force of at least 90 N, in particular between 100 to 150 N, more preferably of 120 N+/−20%, on a triggering means of the drop-out release mechanism for releasing or actuating the release mechanism when it is released. The triggering means can be spring-loaded in particular and ultimately interact with the connection of the upper contact cap of the HV HRC fuse, thus leading at least indirectly to the separation of the upper contact cap.

Preferably, the stroke pin is connected to a secondary melting conductor, in particular a trigger feed wire. A fault current can lead to the interruption of the secondary melting conductor, in particular the trigger feed wire, wherein the stroke pin is released by interruption of the secondary melting conductor, in particular the trigger feed wire.

Preferably, a safety device can be assigned to the stroke pin, which is designed in such a way that after the stroke pin has been released, it can no longer be pressed and/or displaced into the fuse housing. If the stroke pin is thus released, the safety device prevents the stroke pin from resuming a position it held before being released. Thus, the drop-out release mechanism to be arranged on the stroke pin can be permanently actuated by the stroke pin in the event of a short circuit.

Particularly preferably, the winding body is star-shaped and has, in particular, a plurality of adjacent support bars for punctual support of the melting conductor. Such a support is particularly advantageous with regard to the melting-through and fuse behavior of the melting conductor, since this ensures on the one hand an arrangement of the melting conductor on the winding body and on the other hand also an arrangement of the melting conductor and/or the melting conductors that is as “free” and/or predominantly contactless as possible.

In particular, the winding body is designed as a hollow body. An inner, preferably electrically insulating and/or star-shaped inner winding body can be arranged inside the winding body. At least one inner melting conductor can preferably be spirally wound around the inner winding body. The inner winding body can also be at least substantially star-shaped and preferably have a plurality of support bars for selectively supporting the inner melting conductor(s). In particular, the inner winding body is spaced from the inner wall of the outer winding body. The construction and/or design of two winding bodies arranged one inside the other makes it possible in particular to realize a high rated current in a relatively small installation space. In particular, the two winding elements enable rated currents in the order of 60 A+/−30% for a full-range fuse. Finally, the inner winding body ensures that, in addition to the winding bodies arranged on the melting conductor, further inner melting conductors can also be provided, which can also serve to protect the current.

Preferably, the inner winding body can also be designed as a hollow body. Preferably, the secondary melting conductor, in particular the trigger feed wire, for the stroke pin can then be arranged inside the inner winding body and spaced from the inner wall of the inner winding body.

It is particularly preferred that the secondary melting conductor, in particular the trigger feed wire, extends over the entire length of the fuse housing and/or runs axially through the center of the winding body. Accordingly, the secondary melting conductor, in particular the trigger feed wire, does not have to be wound around the winding body or the inner winding body. However, the secondary melting conductor, in particular the trigger feed wire, can be formed at least partially as a spiral.

In addition, the secondary melting conductor, in particular the trigger feed wire, can be connected and/or wired in parallel with the melting conductor and/or the inner melting conductor, in particular so that when a melting conductor melts, the current flows through the secondary melting conductor, in particular the trigger feed wire, which leads to the activation of the stroke pin.

Preferably, for realizing the full-range fuse or the HV HRC fuse, which is preferably designed to fuse the entire range of the high voltage high power, at least one melting conductor and/or inner melting conductor wound around the winding body and/or around the inner winding body is arranged at least in some areas in at least one blow-out tube. Preferably, the blow-out tube is arranged in at least one end region of the winding body and/or of the inner winding body facing the respective cap.

Very preferably, a first blow-out tube is assigned to the winding body and a second blow-out tube to the inner winding body. The arrangement of the blow-out tubes can be such that they are spaced apart from one another and arranged opposite one another, so that one blow-out tube in each case is assigned to an end face region of the fuse and is arranged either on the inner winding body or on the winding body.

Accordingly, two blow-out tubes arranged at the respective end region of the winding body and the inner winding body may be provided for respectively receiving a section of the melting conductor and the inner melting conductor. Also, the first blow-out tube may be arranged on the winding body at an end region facing one contact cap, and a second blow-out tube may be arranged on the inner winding body at an end region facing the other contact cap.

In addition, the blow-out tube can preferably completely surround the melting conductor and/or the inner melting conductor circumferentially. In this context, it is understood that the blow-out tube can extend only over part of the length of the winding body or the inner winding body and thus also only over part of the length of the melting conductor and/or the inner melting conductor.

In a further preferred embodiment, a fastening means is provided on the upper contact cap, preferably for detachable arrangement of the HV HRC fuse on the drop-out release mechanism. In particular, the fastening means can be designed as a nut and/or have an internal thread.

The internal thread can be designed for the arrangement of a filling device. In this design, the fastening means preferably has a passage opening, which is preferably provided centrally on the fastening means. The internal thread can then also be arranged at this passage opening. The passage opening can thus preferably serve to fill the fuse housing with extinguishing agent.

Accordingly, the nut may be designed and provided either for connection to the release mechanism and/or for filling the fuse with the extinguishing agent.

Preferably, a collar projecting opposite and/or from the fuse housing is arranged on the lower, pivotably mounted contact cap and/or is formed as part of the contact cap. In particular, the collar can be formed circumferentially around the fuse housing. Preferably, the collar has at least one opening, in particular wherein the opening may be formed for enclosing a screw or other fastening means for cooperating with the drop-out release mechanism. The collar can thus serve to simplify the arrangement and storage of the entire HV HRC fuse. Consequently, the collar can ensure that the HV HRC fuse does not disengage from the drop-out release mechanism even in the swing-out position.

In particular, at least one, preferably both, end faces of the fuse housing is associated with an inner auxiliary cap for holding the winding body and/or the inner winding body and/or a stroke pin bearing designed to support the stroke pin. In particular, the secondary melting conductor, especially the trigger feed wire, is connected to and/or attached to the upper auxiliary inner cap covered by the upper contact cap.

The inner auxiliary cap can thus be arranged under both the upper and the lower contact cap and ultimately preferably be designed to hold the inner components of the fuse housing. The winding body can preferably be attached to at least one, in particular both, inner auxiliary caps.

In particular, the inner auxiliary cap is at least substantially covered on the outside by the respective contact cap. Alternatively or additionally, it can be provided that the inner auxiliary cap is at least substantially frictionally and/or positively mounted on the fuse housing.

The inner auxiliary cap can serve in particular for optimal centering of the components as well as for achieving low electrical resistances, preferably through the optimal press fit between the respective contact cap and the fuse housing.

Preferably, at least one contact cap and/or the inner auxiliary cap covers at least a partial area of the fuse housing, in particular a partial area of the lateral surface in the end face area. The partial covering in the end face area of the fuse housing can ensure a fixed arrangement of the contact cap and/or the inner auxiliary cap on the fuse housing.

Preferably, the melting conductor, the secondary melting conductor, in particular the trigger feed wire, and/or inner melting conductor has overload points and/or short-circuit constrictions. It may be provided that the respective melting conductors either always have the same shape or different shapes of constriction points and/or punch-outs. The cross-sectional constrictions can be formed as cross-sectional constrictions of the respective melting conductor.

In particular, two overload points designed as cross-sectional constrictions are provided. Alternatively or additionally, a layer comprising solder and/or consisting of solder surrounding the outer lateral surface of the melting conductor and/or the inner melting conductor circumferentially at least in some areas, preferably completely, can preferably be provided between the two directly successive overload points in at least one first section.

The use of the solder can also reduce the melting temperature of the melting conductor and/or the inner melting conductor. The solder may in particular comprise and/or consist of a metal alloy as material. In particular, the metal alloy comprises cadmium, lead, tin, zinc, silver and/or copper. Very preferably, a metal alloy comprising tin and/or silver is provided. The solder can also preferably serve to weaken the physical-chemical processes in the event of an overload, in particular to enable a shutdown—this is also known as the M-effect.

In the case of overload currents, the greatest heat generation ultimately occurs in the area of the solder layer. When the melting temperature is exceeded, the tin and/or silver becomes liquid and forms an alloy with the material of the fuse wire (melting conductor and/or inner melting conductor). This alloy has a lower electrical and thermal conductivity and, in particular, a lower melting point than the material of the melting conductor and/or inner melting conductor. As a result of the increasing heat development, the melting conductor and/or inner melting conductor and/or melting conductor wire becomes molten at the corresponding point below the actual melting point and separates the current path. This phenomenon was discovered by Metcalf in 1939, which is why this is known and referred to as the M-effect. A HV HRC fuse can use the previously described M-effect to trigger the fuse by applying the solder layer to the melting conductor.

In a further preferred embodiment, it can be provided that the melting conductor, the secondary melting conductor, in particular the trigger feed wire, and/or the inner melting conductor has at least one short-circuit constriction in the form of a cross-sectional constriction between two directly adjacent successive overload points. In particular, the minimum width and/or the shape of the cross-sectional constriction of the overload point may differ from the minimum width and/or the shape of the cross-sectional constriction of the short-circuit constriction point. The short-circuit constriction can thus enable safe disconnection in the short-circuit case, as can the overload points in the overload case.

Precise matching of the constriction cross-sections enables the HV HRC fuse to trip in the event of an overload and in the event of a short circuit. Alternatively, it can also be provided that the cross-sectional constrictions of the melting conductor, the secondary melting conductor, in particular the trigger feed wire, and/or the inner melting conductor have at least essentially the same cross-section.

In a further preferred embodiment, the fuse housing is at least substantially hermetically encapsulated. Hermetic encapsulation and/or sealing means an airtight and/or gastight sealing of the system, in particular protected from water and/or liquids.

The material for the melting conductor, the secondary melting conductor, in particular the trigger feed wire, and/or the inner melting conductor is in particular silver, preferably fine silver, and/or electrolytic copper. In particular, the melting conductor may be made of the aforementioned materials. Preferably, the melting conductor is in the form of a fine silver web and/or in the form of a web.

In a further embodiment according to the invention, it is preferably provided that the fuse housing comprises and/or consists of a ceramic material. A ceramic material is to be understood in particular as a plurality of inorganic, non-metallic materials, which can preferably be subdivided into earthenware, stoneware, porcelain and/or special masses. Special ceramic masses are preferably electroceramics and/or high-temperature special masses.

Preferably, the fuse housing of the HV HRC fuse is of hollow cylindrical and/or tubular design. In particular, the upper and lower end faces of the fuse housing are open at least in some areas, as described above.

According to a further preferred embodiment, it is provided that the HV HRC fuse comprises at least two melting conductors, preferably between two to ten melting conductors, further preferably between three to five melting conductors, which are arranged in the fuse housing. Alternatively or additionally, it may also be provided that the HV HRC fuse comprises at least two inner melting conductors, preferably between three to five inner melting conductors. In particular, the melting conductors and/or the inner melting conductors are connected to each other and/or to the contact cap and/or the contact caps in an electrically contacting manner.

The melting conductor and/or the inner melting conductor may be at least substantially directly connected to and/or abut the respective inner auxiliary cap and/or the respective outer contact cap to achieve low contact resistances.

An extinguishing agent, in particular an extinguishing sand filling, preferably quartz sand, and/or air, can be provided in the fuse housing. The extinguishing agent serves to extinguish an arc and/or to cool down the possibly melted melting conductor and/or the inner melting conductor and/or the melting conductor residues in the event of switching of the HV HRC fuse, in particular in the event of a short circuit.

Preferably, the fuse housing has a maximum diameter of at least 40 mm, preferably between 40 mm to 100 mm, more preferably between 50 mm to 80 mm and in particular of 70 mm+/−10%. A diameter of the aforementioned type is particularly advantageous, especially for connection with the drop-out release mechanism known in practice. In this context, it may preferably be provided that the fuse housing has a maximum length of at least 100 mm, preferably between 150 to 500 mm, more preferably between 200 to 300 mm and in particular of 280 mm+/−10%. The aforementioned length is also particularly advantageous for arranging the HV HRC fuse on a drop-out release mechanism.

Furthermore, it is understood that any intermediate intervals and individual values are included in the above-mentioned intervals and range limits and are to be regarded as disclosed as essential to the invention, even if these intermediate intervals and individual values are not specifically indicated.

Further features, advantages and possible applications of the present invention will be apparent from the following description of examples of embodiments based on the drawing and the drawing itself. In this context, all the features described and/or illustrated constitute the subject-matter of the present invention, either individually or in any combination, irrespective of their summary in the claims or their relation back.

BRIEF DESCRIPTION OF THE DRAWINGS

It shows.

DETAILED DESCRIPTION

Figure 1:
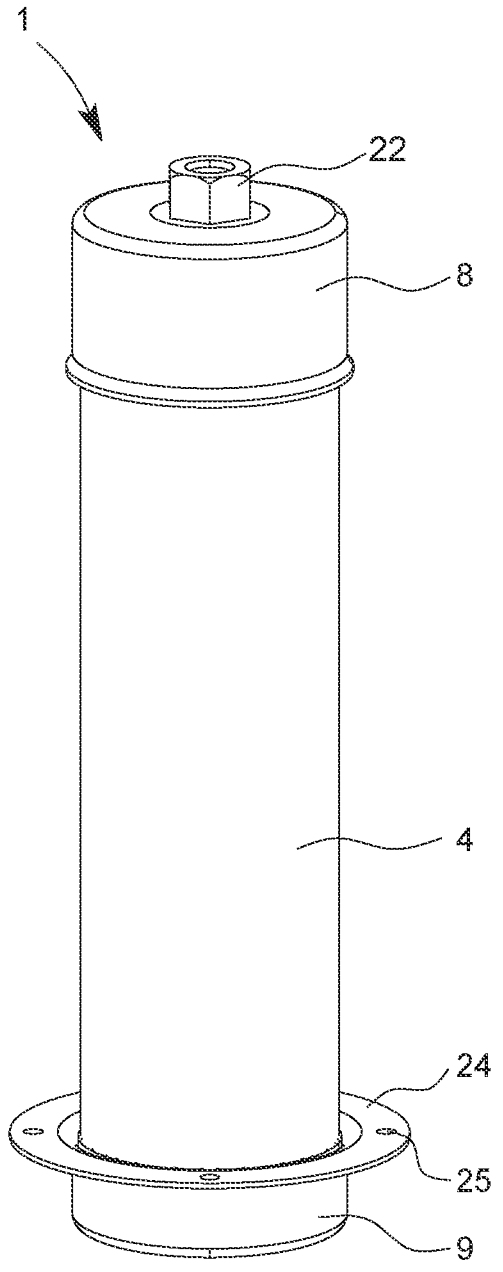
FIG. 1 is a schematic perspective view of a HV HRC fuse.
Figure 2:
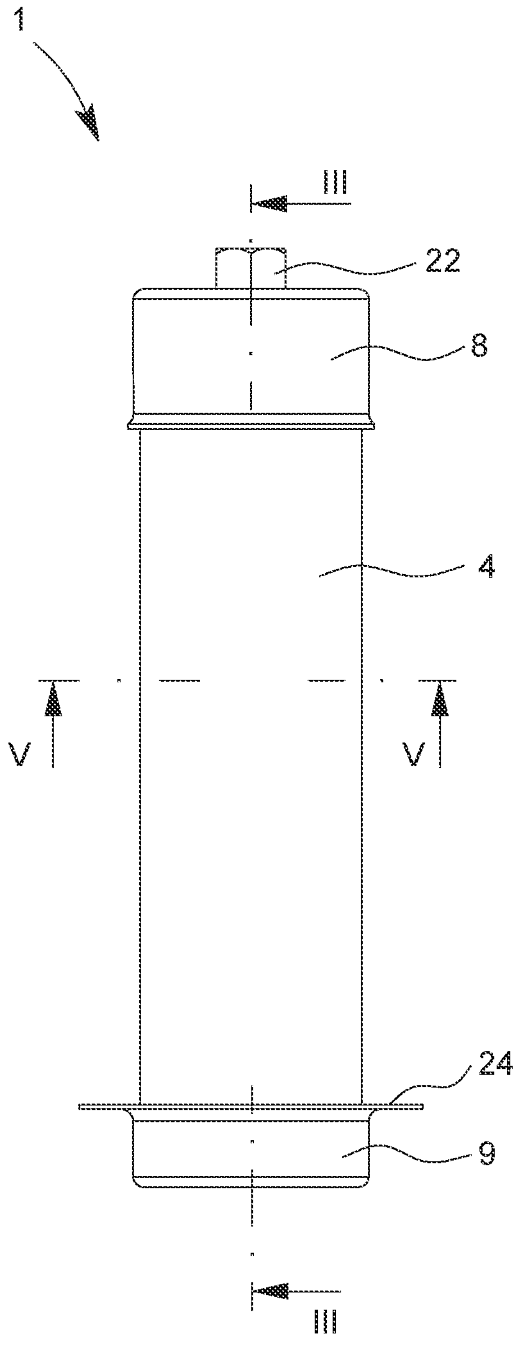
FIG. 2 is a schematic side view of the HV HRC fuse shown in FIG. 1.
Figure 6:
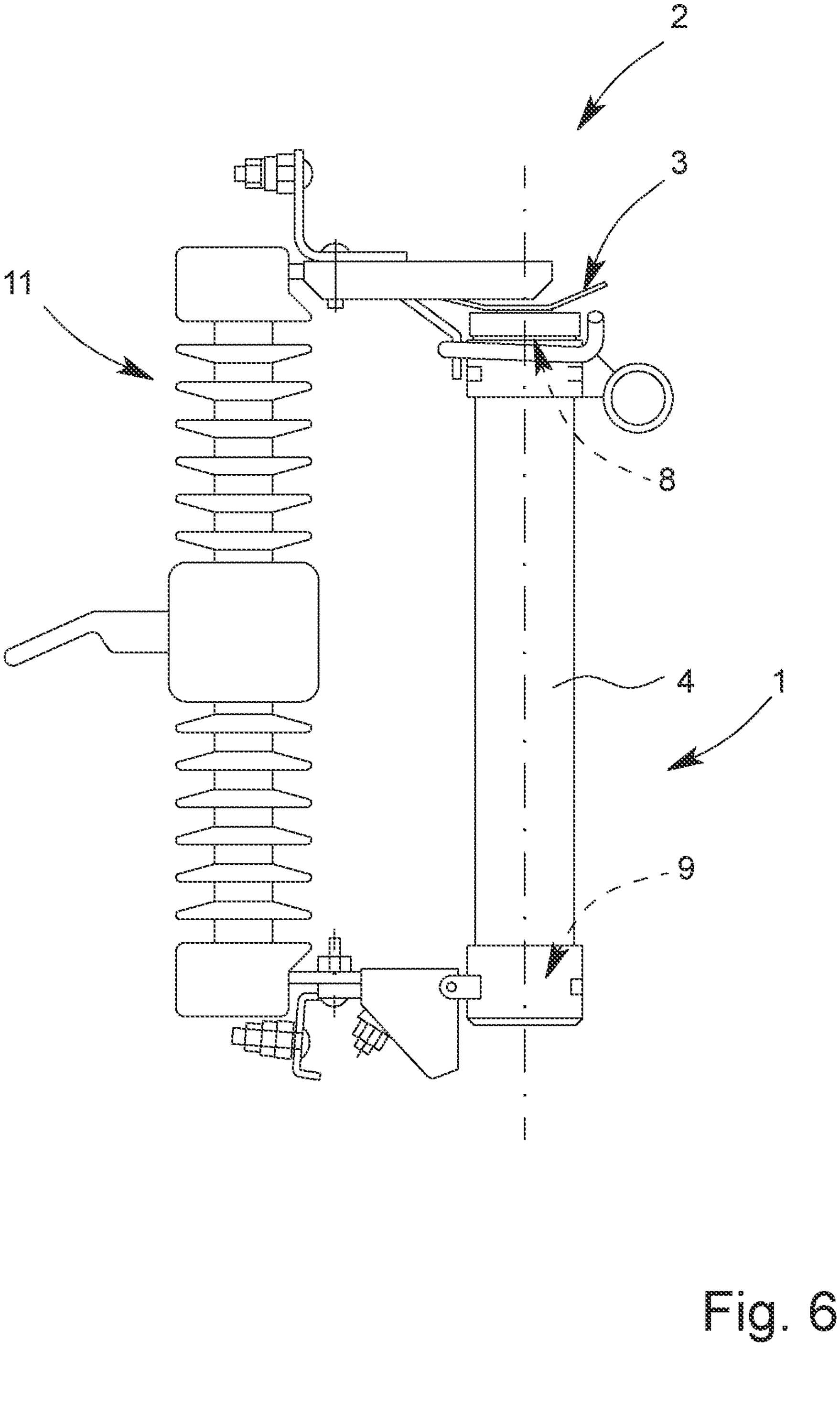
FIG. 6 is a schematic representation of a use of a HV HRC fuse for a drop-out fuse system according to the invention in a first state.
Figure 7:
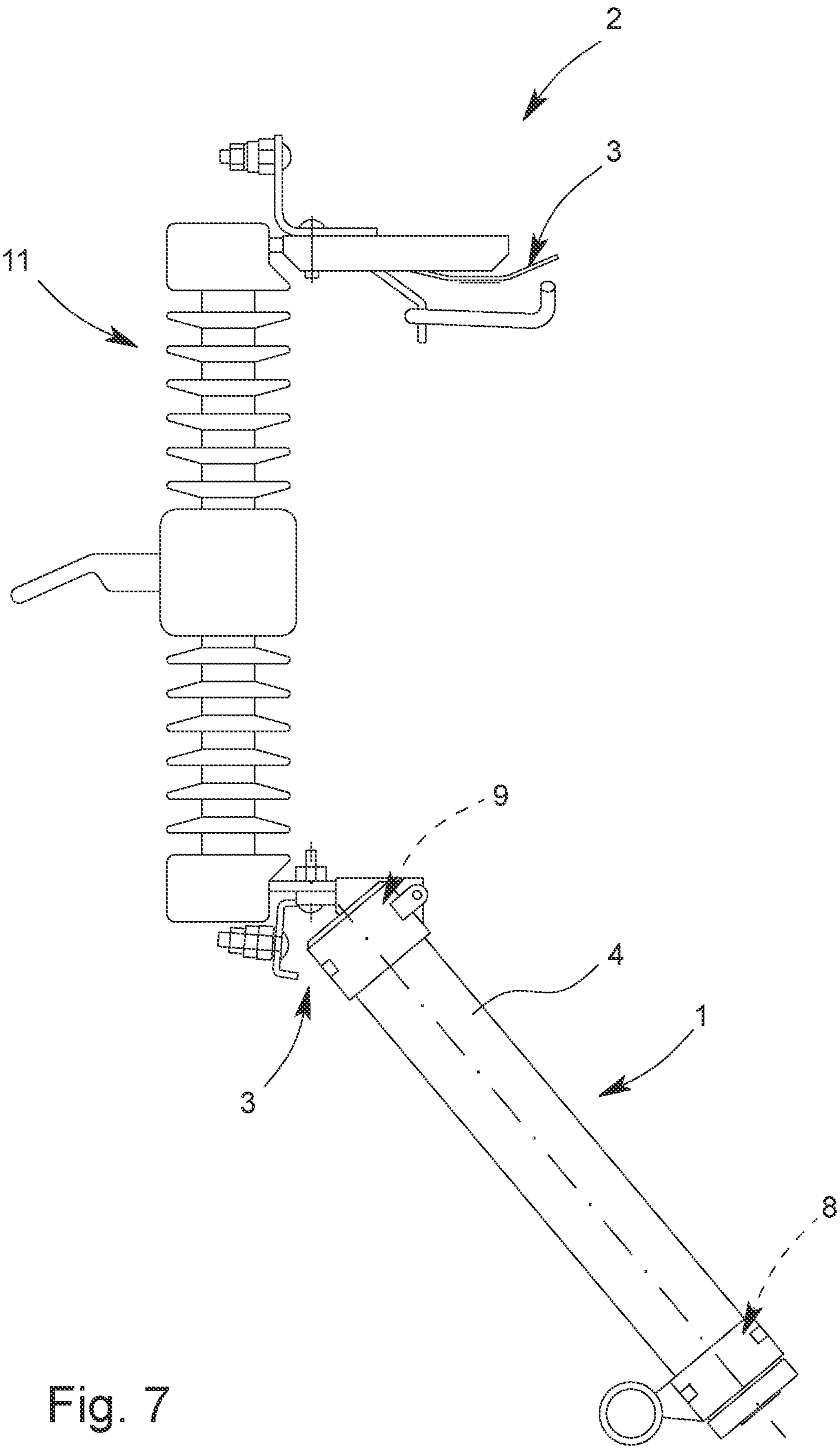
FIG. 7 is a schematic representation of the fuse system in FIG. 6 in a second state.

FIG. 1 shows a perspective schematic representation of a HV HRC fuse 1 as used in accordance with the invention for a drop-out fuse system 2, which can be seen schematically in FIGS. 6 and 7. FIG. 2 shows a side view of the HV HRC fuse 1 shown in FIG. 1. FIG. 6 shows that the drop-out fuse system 2 has a drop-out release mechanism 3. The HV HRC fuse 1 is connected to the drop-out release mechanism 3.

Figure 4:
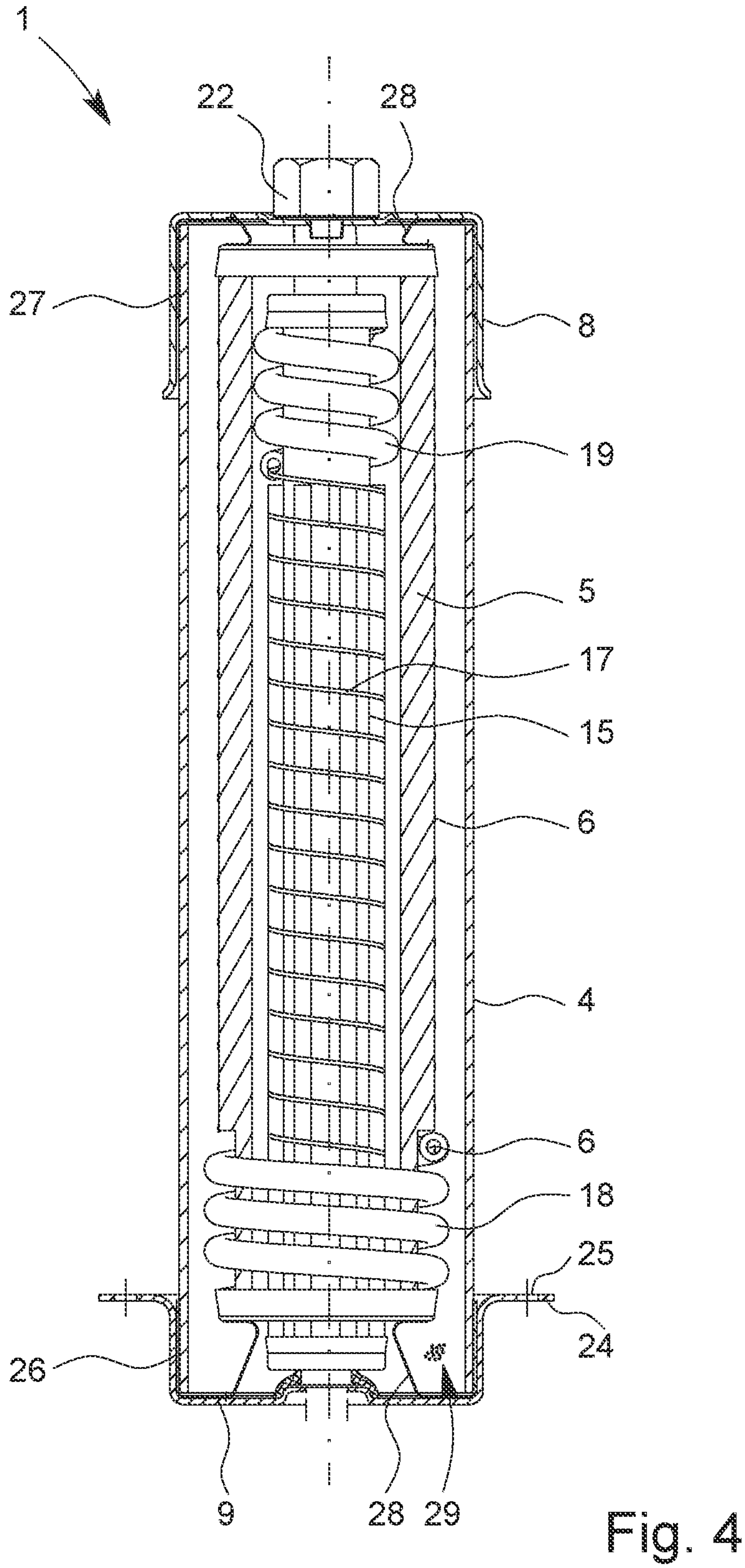
FIG. 4 is a schematic cross-sectional view of a further embodiment of a HV HRC fuse according to the invention.
Figure 10:
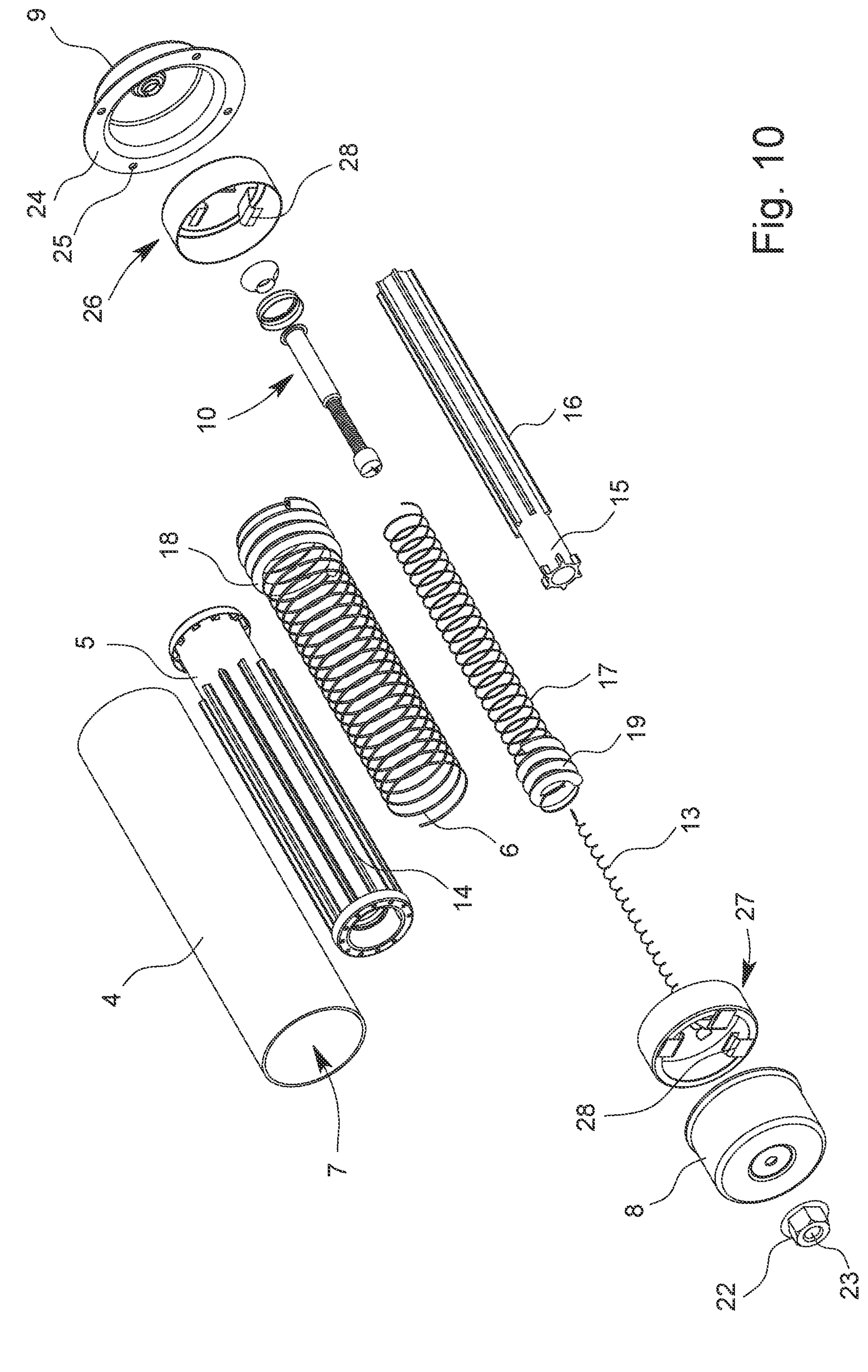
FIG. 10 is a schematic exploded view of components of a HV HRC fuse according to the invention.

FIG. 1 shows that the HV HRC fuse 1 has an outer fuse housing 4. At least one melting conductor 6 wound around at least one winding body 5 is provided in the fuse housing 4. FIG. 4 shows a schematic cross-sectional view of a HV HRC fuse 1, from which the winding body 5 can be seen schematically. Only part of the melting conductor 6 can be seen from this illustration. However, the melting conductor 6 is shown in more detail in the exploded view of the components of the HV HRC fuse 1 in FIG. 10. FIG. 10 illustrates that the melting conductor 6 is wound in a spiral shape. The winding body 5 ultimately serves to arrange the melting conductor 6.

Figure 3A:
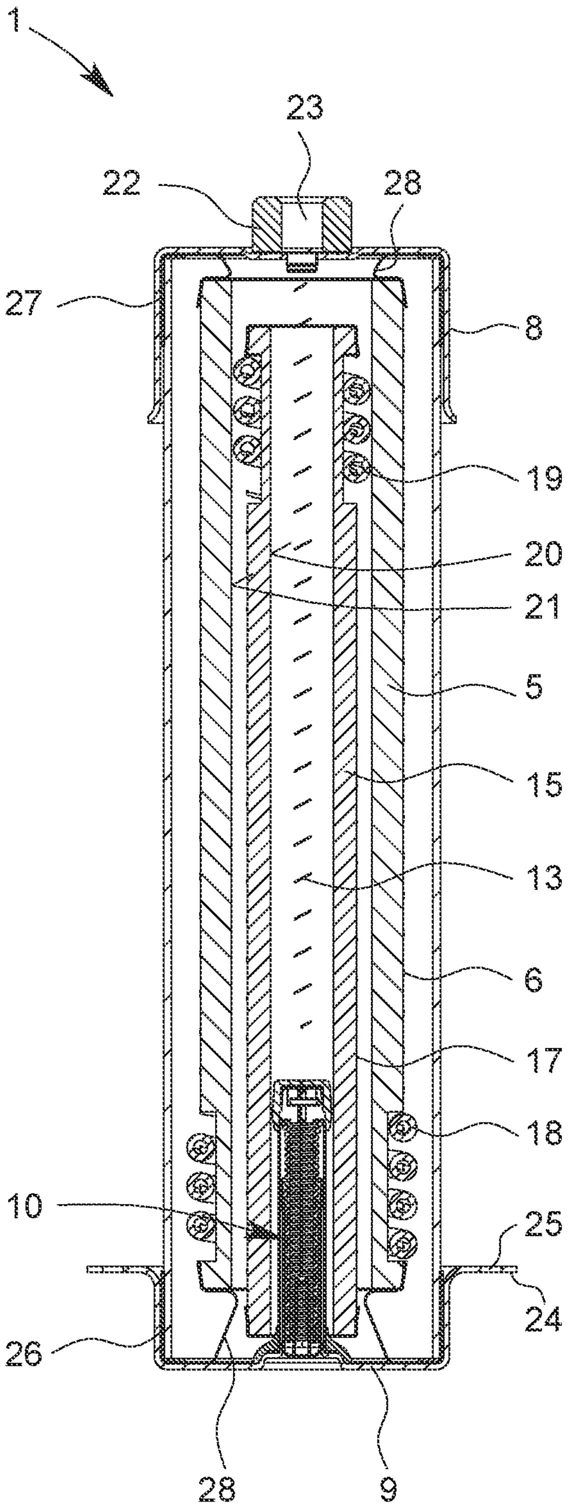
FIG. 3A is a schematic cross-sectional view along section of FIG. 2.

FIG. 3A shows the section from FIG. 2. Furthermore, it can be seen from FIG. 3A that the fuse housing 4 is formed at least partially open on two end faces 7, which is also shown in the exploded view according to FIG. 10.

FIG. 2 shows that at least one contact cap 8, 9, preferably designed for electrical contacting, is arranged on the end face of the fuse housing 4. A distinction is made between an upper contact cap 8 and a lower contact cap 9. The upper contact cap 8 faces away from the substrate (floor) in the state of use, with the lower contact cap 9 facing the substrate in the state of use.

FIGS. 6 and 7 ultimately show two different states of the HV HRC fuse 1 connected to the drop-out release mechanism 3. For example, FIG. 6 shows that the upper contact cap 8 can be releasably connected to the drop-out release mechanism 3 in a contacting position. FIG. 6 shows the contacting position of the HV HRC fuse 1—i.e., the HV HRC fuse 1 in the non-tripped state, as also shown, for example, in FIG. 3A. Ultimately, the state shown in FIG. 6 can also be referred to as the "operating state". The lower contact cap 9 is pivotally mounted on the drop-out release mechanism 3 in the contacting position (and also otherwise). Such a pivotable mounting can also be seen in FIG. 7. FIG. 7 shows that the drop-out release mechanism 3 is designed in such a way that tripping the HV HRC fuse 1 results in tripping the drop-out release mechanism 3, whereby the upper contact cap 8 is separated from the drop-out release mechanism 3 and the pivotally mounted lower contact cap 9 swings out, whereby the HV HRC fuse 1 swings out from the contacting position to the swing-out position. The swing-out position of the HV HRC fuse 1 in this respect is shown in FIG. 7. The state shown in FIG. 7 can also be referred to as the "tripped state". A swing-out of the HV HRC fuse 1 is ultimately ensured by an interaction between the tripped HV HRC fuse 1 and the drop-out release mechanism 3. For this purpose, the HV HRC fuse 1 may ultimately have a special mechanism, which will be discussed below. In particular, the HV HRC fuse 1 can be transferred from the contacting position to the drop-out position in the drop-out fuse system 2 without a spark. Thus, the HV HRC fuse 1 can in particular switch without sparking and trigger the drop-out release mechanism 3 by a sparkless switching. The mechanical rotational movement from the contacting position to the swing-out position is survived by the HV HRC fuse 1, in particular, without causing any damage.

The drop-out fuse system 2, as shown in FIG. 6, may be designed in accordance with ANSI/IEEE C37.41 (as of June 2022).

The HV HRC fuse 1 shown in FIG. 1 can be designed in such a way that a rated current of greater than 30 A is ensured, preferably at a rated voltage of greater than 5 kV. The rated breaking capacity may further be greater than 1 kA, in particular greater than 20 kA, or between 20 kA to 50 kA. Furthermore, the rated voltage of the HV HRC fuse 1 may be greater than 5 kV and/or between 4 kV to 80 kV.

Figure 3B:
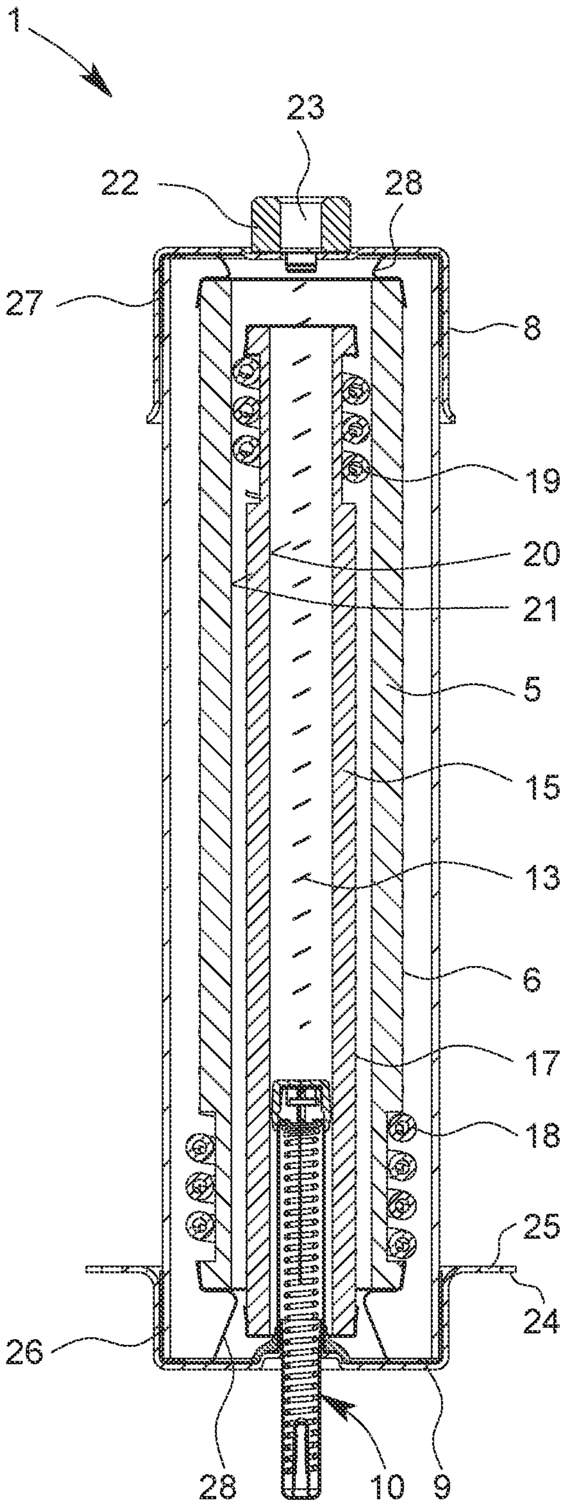
FIG. 3B is a schematic cross-sectional view of the HV HRC fuse shown in FIG. 3A in the tripped state.

FIGS. 3A and 3B illustrate that the HV HRC fuse 1 has a spring-loaded stroke pin 10 movably mounted in the fuse housing 4 and held in the fuse housing 4. The stroke pin 10 is shown in more detail also in FIG. 10, which also illustrates the corresponding spring loading. In this context, FIGS. 3A and 3B show different positions of the HV HRC fuse 1. FIG. 3A illustrates the "normal state" of the HV HRC fuse 1—i.e., the non-tripped state. FIG. 3B only serves to schematically illustrate that the stroke pin 10 exits when the HV HRC fuse 1 is tripped. In this context, it should be noted that FIG. 3B does not take into account that in the event of tripping of the HV HRC fuse 1, for example, the melting conductor 6 melts through or a corresponding extinguishing sand filling has been used to extinguish the arc. However, FIG. 3B schematically shows the exit of the stroke pin 10 from the lower contact cap 9.

In particular, the stroke pin 10 can be used to interact with the drop-out release mechanism 3 and ultimately at least indirectly transfer the HV HRC fuse 1 from the contacting position to the swing-out position when tripped.

The stroke pin 10 together with its bearing can preferably be arranged in the interior of the ceramic winding body 5, whereby the size can be reduced and optimum insulation to the melting conductor system 2 can be ensured.

The stroke pin 10 can be provided for the previously discussed interaction with the drop-out release mechanism 3. For this purpose, the stroke pin 10 can emerge from the fuse housing 4, in particular the lower contact cap 9, after release with a defined exit energy and/or release force and preferably reach a minimum travel length required to trigger the drop-out release mechanism 3 within a stroke pin travel time. In this context, FIG. 3A shows the stroke pin 10 in the maximally extended state. As previously explained, the stroke pin 10 can emerge from the lower contact cap 9 after release and lead to actuation of the drop-out release mechanism 3, in particular by striking a spring-loaded section of the drop-out release mechanism 3. At least indirectly, this can lead to the HV HRC fuse 1 swinging out, although separation of the upper contact cap 8 from the drop-out release mechanism 3 is required for this.

The HV HRC fuse 1 can be used with the corresponding fuse system 2 on overhead lines or high-voltage lines for fuse protection. For this purpose, it is known that the HV HRC fuse 1 is arranged obliquely to the overhead lines in the contacting position, but this is not shown in more detail. Also, FIGS. 6 and 7 show a fuse insulator 11, which may be formed, for example, of porcelain and/or of a polymer having electrically insulating properties. In this regard, the drop-out release mechanism 3 may be connected to the fuse insulator 11. The entire assembly—that is, the entire drop-out fuse system 2—can then be arranged on the corresponding line or the like to be fused.

Upon release, the stroke pin 10 can exert a force of at least 90 N and in particular of 120 N+/−20% on a triggering means 12 of the drop-out release mechanism 3 for release. This triggering means 12 can in particular be spring-loaded and can at least indirectly lead to the separation of the upper contact cap 8 from the drop-out release mechanism 3.

Figure 8:
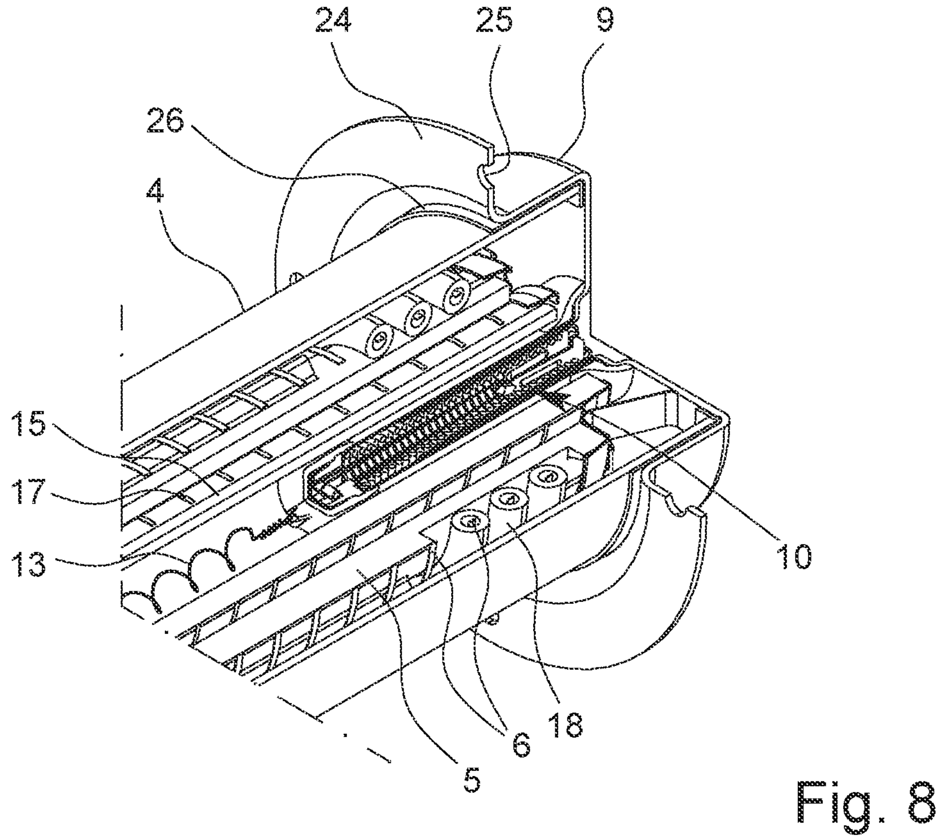
FIG. 8 is a schematic perspective view of a partial section of a HV HRC fuse according to the invention.
Figure 9:
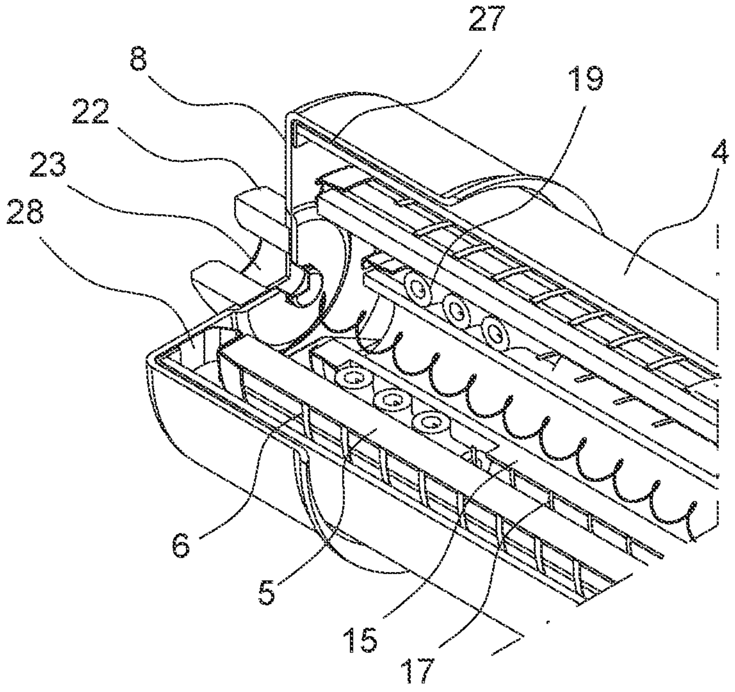
FIG. 9 is another schematic representation of a further partial section of a further embodiment of a HV HRC fuse according to the invention.

FIGS. 8 and 9 show the two different end face areas of the HV HRC fuse 1 on which the respective contact caps 8 and 9 are arranged. A section of the HV HRC fuse 1 has been removed to show the “inner workings”, as shown schematically in FIGS. 8 and 9.

FIG. 8 shows that the stroke pin 10 is connected to a secondary melting conductor 13, in particular a trigger feed wire. The secondary melting conductor 13, in particular the trigger feed wire, is designed in such a way that a fault current leads to the interruption of the secondary melting conductor 13, in particular the trigger feed wire, with the stroke pin 10 being released by the interruption of the secondary melting conductor 13. The secondary melting conductor 13, in particular the trigger feed wire, may be arranged inside the winding body 5 and preferably extend at least substantially over the length of the fuse housing 4, as this is shown schematically in FIG. 3A, which illustrates the corresponding turns of the secondary melting conductor 13, in particular the trigger feed wire, at least schematically in the cross-sectional view. However, the length of the secondary melting conductor 13 can also be taken from the exploded view of FIG. 10 and the perspective view of FIG. 11. The secondary melting conductor 13, in particular the trigger feed wire, can be at least indirectly connected to the stroke pin 10 in this case, in particular to the stroke pin bearing and/or holder.

Figure 5:
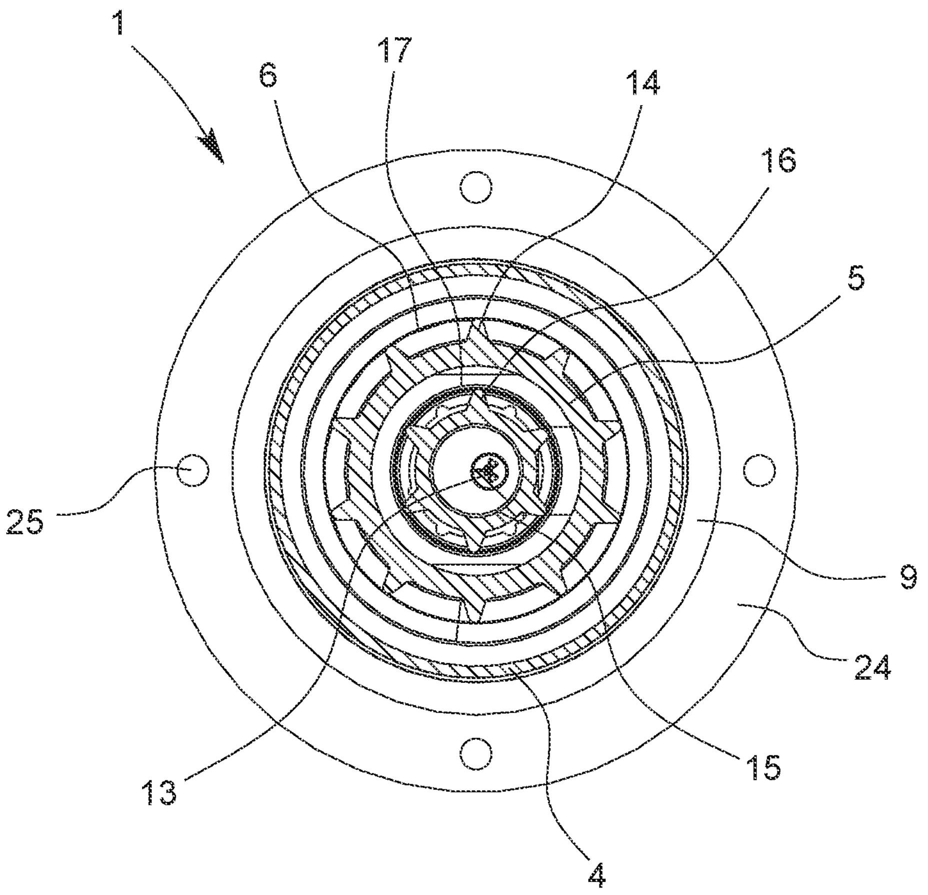
FIG. 5 is a schematic cross-sectional view along section V-V of FIG. 2.

FIG. 5 shows a cross-section along the section V-V of FIG. 2. It can be seen schematically from FIG. 5 that the winding body 5 is of star-shaped design and has a plurality of support bars 14 for punctual support of the melting conductor 6, which are spaced apart from one another. In addition, the spacing is also uniform in the embodiment example shown in FIG. 5.

Furthermore, FIG. 5 illustrates that the winding body 5 is designed as a hollow body, with an inner and electrically insulating inner winding body 15 being arranged inside the winding body 5. FIG. 5 further illustrates that the inner winding body 15 is also star-shaped and has regularly spaced inner support bars 16. It is not shown that the inner support bars 16 can also have a different spacing from one another. The inner support bars 16 serve to arrange or support an inner melting conductor 17. The inner melting conductor 17 can preferably be wound spirally around the inner winding body 15.

In FIG. 4, it is shown that blow-out tubes 18 are provided. The blow-out tubes 18, 19 can be used to provide full-range protection by the HV HRC fuse 1. In the embodiment example shown in FIG. 4, two blow-out tubes 18, 19 are provided, a first blow-out tube 18 being arranged on the winding body 5 and a second blow-out tube 19 being arranged on the inner winding body 15. The first blow-out tube 18 serves to receive a section of the melting conductor 6, and in turn the second blow-out tube 19 may serve to receive a section of the inner melting conductor 17. The blow-out tubes 18, 19 are arranged at the respective end portions of the winding bodies 5, 15 and also receive the respective end portion of the melting conductors 6, 17.

In FIG. 4, it is shown that the blow-out tubes 18, 19 surround the melting conductor 6 and the inner melting conductor 17, respectively, at least substantially completely in the corresponding section and also extend and/or are wound at least partially spirally around the winding body 5 and the inner winding body 15, respectively.

The first blow-out tube 18 faces the lower contact cap 9 and the second blow-out tube 19 faces the upper contact cap 8.

Not shown is that only one blow-out tube 18, 19 can also be provided, which is arranged either on the winding body 5 or the inner winding body 15.

FIG. 5 shows that the inner winding body 15 is also formed as a hollow body. The secondary melting conductor 13, in particular the trigger feed wire, can be arranged in particular inside the inner winding body 15 and preferably spaced from the inside 20 of the inner winding body 15.

Furthermore, FIG. 5 still shows that the inner winding body 15 can also be spaced from the inner side 21 of the winding body 5.

FIG. 2 shows that a fastening means 22 is provided on the upper contact cap 8 for releasably arranging the HV HRC fuse 1 on the drop-out release mechanism 3, as shown schematically in FIG. 6. In FIG. 6, for illustrative reasons, the fastening means 22 is not seen in greater detail, as this is connected to corresponding components of the drop-out release mechanism 3.

In the embodiment shown in FIG. 2, the fastening means 22 is designed as a nut and has an internal thread 23 not shown in more detail, as shown in FIG. 3A, but also in FIGS. 9 and 10. The internal thread 23 is not shown in more detail, but this is arranged on the inner side of the fastening means 22, which is numbered with the reference sign 23.

The fastening means 22 may have a passage opening. The passage opening may be provided centrally on the fastening means 22 and serve to fill the fuse housing 4 with extinguishing agent, in particular since the internal thread 23 may be provided for arranging a filling device, the filling device being used to fill the fuse housing 4 with an extinguishing agent.

FIG. 10 shows that the lower contact cap 9 has a collar 24 projecting opposite and/or from the fuse housing 4, the collar 24 being arranged circumferentially around the fuse housing 4. The collar 24 has at least one opening 25, which is preferably provided for enclosing a screw and for cooperating with the drop-out release mechanism 3. Due to the design of the drop-out release mechanism 3, it is not possible to take a closer look at FIGS. 6 and 7 to see the collar 24, as this is arranged in a corresponding holder of the drop-out release mechanism 3.

FIGS. 8 and 9 show that inner auxiliary caps 26 and 27 are provided. FIG. 8 shows that an inner auxiliary cap 26 may be associated with the lower contact cap 9, whereas FIG. 9 shows that another inner auxiliary cap 27 may be associated with the upper contact cap 8.

The inner auxiliary caps 26 and 27 are also shown in more detail in FIG. 10. It is not shown that only one inner auxiliary cap 26, 27 can be provided.

In the embodiment examples shown in FIGS. 8 and 9, the inner auxiliary caps 26, 27 are each at least substantially completely covered by the respective associated contact cap 8, 9.

The inner auxiliary cap 26, 27 may be formed to support the winding body 5 and/or the inner winding body 15 and/or a stroke pin bearing formed to support the stroke pin 10.

Figure 11:
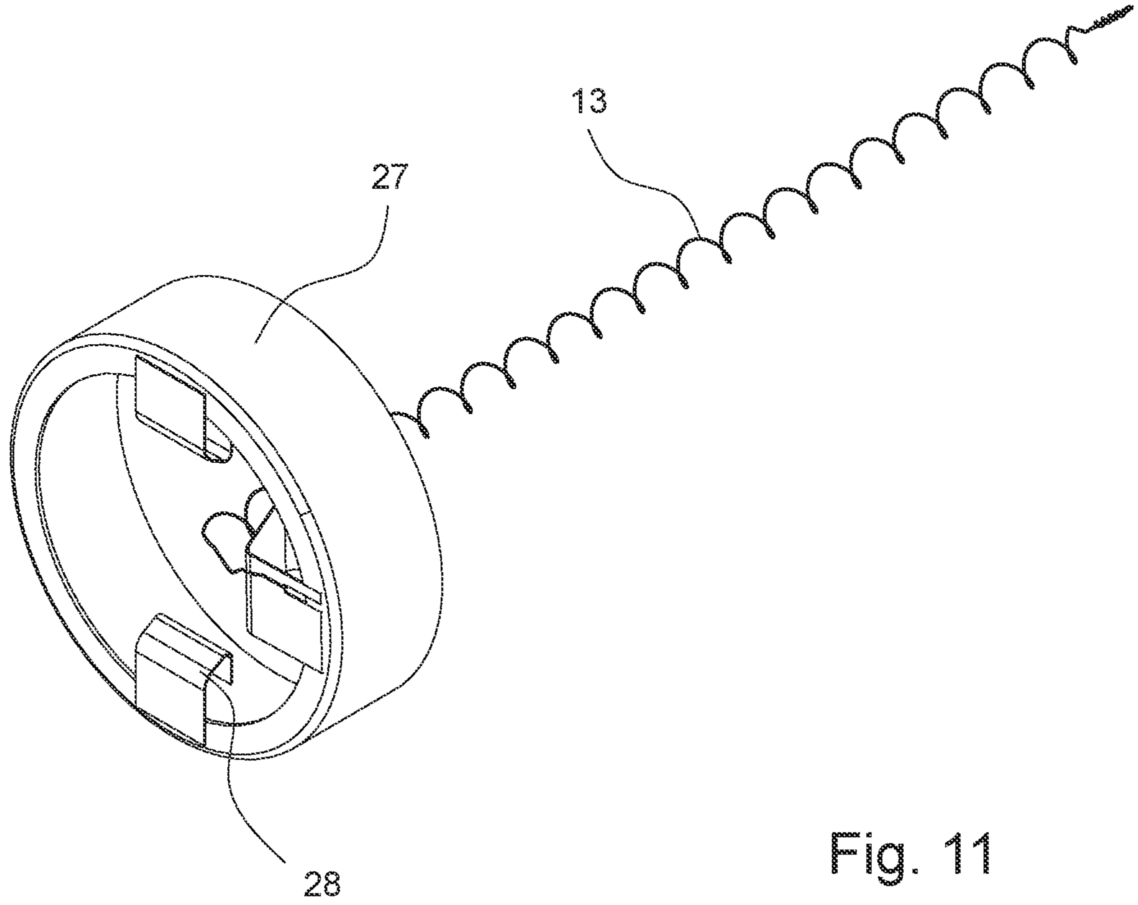
FIG. 11 is a schematic perspective view of an inner auxiliary cap with a secondary melting conductor arranged thereon, in particular a trigger feed wire.

FIG. 11 shows that the inner auxiliary cap 27 is provided for arranging and/or holding the secondary melting conductor 13, in particular the trigger feed wire. For arranging the components of the HV HRC fuse 1, the inner auxiliary cap 26, 27 can have arrangement means 28, in particular as a connection lug, as shown in FIGS. 10 and 11. The arrangement means 28, in particular the connection lugs, may be provided in particular for engaging behind a section of the winding body 5 and/or the inner winding body 15. The winding body 5 and/or the inner winding body 15 can have corresponding formations for this purpose.

Furthermore, the inner auxiliary cap 26, 27 can be mounted at least substantially frictionally and/or positively on the fuse housing 4. Ultimately, the inner auxiliary caps 26, 27 serve for optimum centering of the components as well as for achieving low transition resistances, in particular through respective press fits.

It is not shown in more detail that the melting conductor 6, the secondary melting conductor 13, in particular the trigger feed wire, and/or the inner melting conductor 17 have overload points and/or short-circuit constrictions. Not shown is that two overload points formed as a cross-sectional constriction are provided, wherein a solder section may further be provided between two successive overload points. This solder section can circumferentially surround the outer lateral surface of the melting conductor 6 and/or the inner melting conductor 17 at least in certain regions.

In FIG. 4, it is schematically shown that an extinguishing agent 29, in particular an extinguishing sand, is provided in the fuse housing 4. Preferably, the fuse housing 4 is filled with the extinguishing agent 29, which is not shown in more detail for illustration purposes. In particular, quartz sand may be provided as the extinguishing agent 29.

Also not shown in more detail is that the fuse housing 4 has a maximum diameter of at least 40 mm, preferably between 50 mm to 80 mm. In addition, it is not shown in more detail that the fuse housing 4 has a maximum length of at least 100 mm and in particular between 200 mm to 300 mm.

LIST OF REFERENCE SIGNS

1 HV HRC fuse
2 Drop-out fuse system
3 Drop-out release mechanism
4 Fuse housing
5 Winding body
6 Melting conductor
7 End face
8 Upper contact cap
9 Lower contact cap
10 Stroke pin
11 Fuse insulator
12 Triggering means
13 Secondary melting conductor
14 Support bars
15 Inside winding body
16 Inner support bars
17 Inner melting conductor
18 First blow-out tube
19 Second blow-out tube
20 Inner side from 15
21 Inner side from 5
22 Fastening means
23 Internal thread
24 Collar
25 Opening from 24
26 Inner auxiliary cap
27 Inner auxiliary cap
28 Arrangement means
29 Extinguishing agents

What is claimed is:

1. Use of a high voltage high rupturing capacity (HV HRC) fuse for a drop-out fuse system with a drop-out release mechanism, wherein the high voltage high rupturing capacity fuse has an outer fuse housing, wherein at least one melting conductor, which is wound around at least one winding body, is provided in the fuse housing, wherein the fuse housing is designed to be at least partially open on two end faces, wherein upper and lower contact caps are respectively arranged on the end faces of the fuse housing;

wherein the upper contact cap is detachably connectable in a contacting position with the drop-out release mechanism and the lower contact cap is pivotally mounted on the drop-out release mechanism;

wherein the drop-out release mechanism is configured such that tripping of the high voltage high rupturing capacity fuse results in tripping of the drop-out release mechanism, whereby the upper contact cap is separated from the drop-out release mechanism and the high voltage high rupturing capacity fuse swings out from the contacting position to a swing-out position;

wherein the winding body is designed as a hollow body, and wherein an inner winding body is designed as a hollow body arranged in the winding body and a secondary melting conductor is arranged in the inner winding body; and wherein the high voltage high rupturing capacity fuse has a spring-loaded stroke pin movably mounted in the fuse housing and held in the fuse housing and wherein the stroke pin reaches a minimum travel length required to trigger the drop-out release mechanism within a stroke pin travel time and exerts a force of at least 90 N on a triggering means of the drop-out release mechanism for triggering upon release.

2. Use according to claim 1, wherein the high voltage high rupturing capacity fuse is designed in such a way that a rated current of greater than 30 A is ensured at a rated voltage of greater than 5 kV; and/or wherein a rated breaking capacity is greater than 1 kA; and/or wherein the rated voltage of the high voltage high rupturing capacity fuse is greater than 5 kV.

3. Use according to claim 1, wherein the stroke pin emerges from the fuse housing after release with a predetermined force and resulting exit energy.

4. Use according to claim 1, wherein the stroke pin is connected to the secondary melting conductor.

5. Use according to claim 1, wherein the winding body is star-shaped and has a plurality of adjacent support bars for the punctual support of the at least one melting conductor.

6. Use according to claim 1, wherein the inner winding body is electrically insulating and/or star-shaped.

7. Use according to claim 1, wherein the at least one melting conductor is wound around the winding body in at least a region of the winding body at a blow-out tube.

8. Use according to claim 1, wherein the secondary melting conductor is a trigger feed wire.

9. Use according to claim 1, wherein a fastening means is provided on the upper contact cap for detachable arrangement of the high voltage high rupturing capacity fuse on the drop-out release mechanism.

10. Use according to claim 9, wherein the fastening means has a passage opening.

11. Use according to claim 1, wherein a collar projecting opposite and/or from the fuse housing is arranged on the lower contact cap.

12. Use according to claim 1, wherein at least one end face of the fuse housing is/are assigned an inner auxiliary cap for holding the winding body.

13. Use according to claim 6, wherein the melting conductor and/or secondary melting conductor has overload points and/or short-circuit constrictions.

14. Use according to claim 1, wherein the fuse housing has a maximum diameter of at least 40 mm; and/or wherein the fuse housing has a maximum length of at least 100 mm.

15. Use according to claim 1, wherein the high voltage high rupturing capacity fuse is a high voltage high rupturing capacity full-range fuse.

16. Use according to claim 1, wherein the at least one melting conductor is wound spirally around the at least one winding body, and wherein the at least one winding body is an electrically insulating winding body.

17. Use according to claim 1, wherein the upper and the lower contact caps are designed for electrical contacting.

18. Use according to claim 7, wherein the blow-out tube completely circumferentially surrounds the melting conductor.

* * * * *